CARD READER

Filed July 27, 1966 2 Sheets-Sheet 1

INVENTORS.
STANLEY R. JONES
BRIAN H. LONG
By White & Haefliger
ATTORNEYS.

CARD READER

Filed July 27, 1966 2 Sheets-Sheet 2

INVENTORS.
STANLEY R. JONES
BRIAN H. LONG
By White & Haefliger
ATTORNEYS.

United States Patent Office 3,500,021
Patented Mar. 10, 1970

3,500,021

CARD READER

Stanley R. Jones, Santa Ana, and Brian H. Long, Orange, Calif., assignors to Astrodata Inc., Anaheim, Calif., a corporation of California Filed July 27, 1966, Ser. No. 568,263
Int. Cl. G06k 7/00; H01h 43/08
U.S. Cl. 235—61.11 12 Claims

ABSTRACT OF THE DISCLOSURE

The disclosure concerns a card reader employing electrical contacts comprising wire defining pre-tensioned torsion spring loops, with cantilever contact portions to register with tab card symbol zones. The construction also enables simultaneous reading of two such cards.

This invention relates generally to tabulating card reading, and more specifically concerns improvements in equipment operable to convert pre-punched holes in tabulating cards into electrical data or information.

The utility of tabulating cards as sources of electrical data is well established, such cards being useful for example in data processing, processing, process control, and programming application to name only a few. The derivation of such electrical data involved reading or detecting the existence of prepunched holes in the card; however, equipment performing this function has in general lacked the unusual advantages of the apparatus with which the present invention is concerned. Among these advantages are included the use of electrical contacts constructed in advantageous relation to relatively movable contact and terminal boards so as to contribute to highly reliable and positive card reading without excessive spring resistance; the provision of actuator, cam and spring elements assembled in unique relation and operable to carry out rapid relative movement of the boards for quick and accurate reading of tab cards; and an assembly permitting simultaneous reading of multiple tab cards.

Accordingly, it is a major object of the invention to provide a card reader embodying the above-mentioned advantages, to meet the need for an improved device of this type. Basically, the reader comprises:

(a) First and second boards spaced apart to receive a tab card therebetween;

(b) Electrical terminals on the first board to register with tab card symbol zones subject to selective punch-out;

(c) Electrical contacts carried by the second board and comprising wire looped to form cantilever springs with contact portions projecting in cantilever relation and toward the first board for registration with the tab card symbol zones; and (d) Means to effect reduction of the spacing between the boards to cause contact portions in registration with punched out symbol zones to engage the terminals and flex with terminal wiping action and to cause contact portions in registration with unpunched out symbol zones to engage the tab card and likewise flex.

As will be seen, the contacts are arranged in rows and columns to correspond to tab card symbol zone rows and columns, and the terminals on the first board comprise parallel busses corresponding to the column arrangement of the contacts. Further, an insulative spacer is typically carried by the second board to forcibly engage that side of the tab card toward which the contacts project, the spacer containing openings receiving the contacts.

Another important object of the invention is to provide actuator, cam and spring elements assembled to resiliently urge the first (terminal) board toward the second (contact) board, the mechanism having a first position in which the tab card is freely insertible into and removable from the space between the boards, and a second position in which the tab card is clamped in position between the board. This construction further makes possible an assembly construction able to handle two cards at the same time. Thus, two contact boards may be located between two terminal boards, in layered relation, and the cam, spring and actuator elements assembled to resiliently and simultaneously urge the terminal boards toward the contact boards, as will be described.

These and other objects and advantages of the invention, as well as the details of illustrative embodiments, will be more fully understood from the following detailed description of the drawings, in which.

Figure 1:
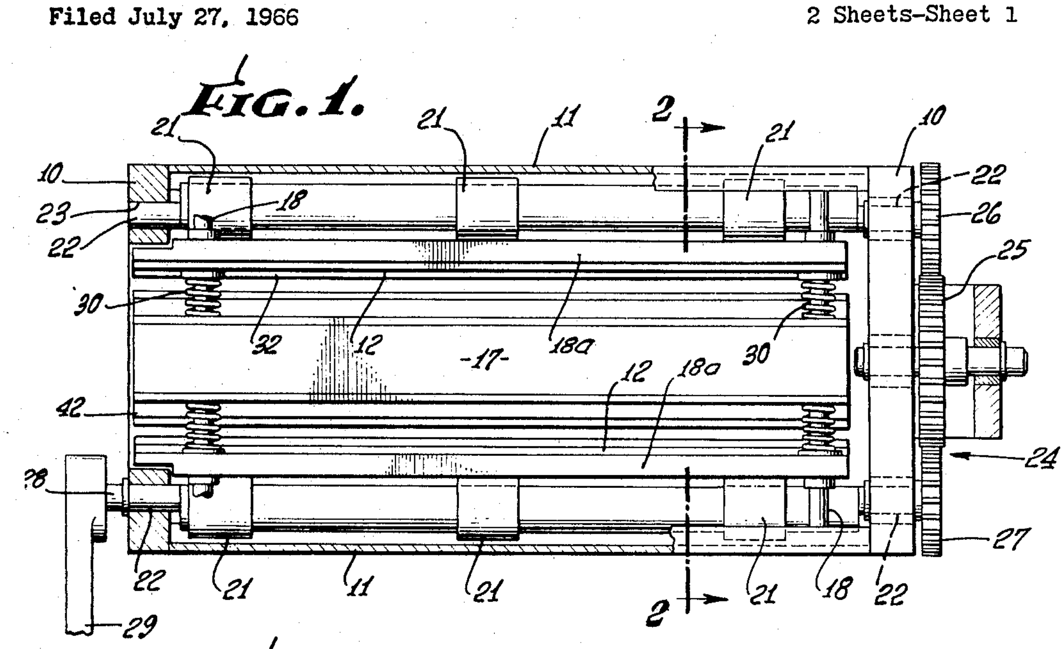
FIG. 1 is a side elevation showing the overall assembly.

In the drawings, a housing or frame to carry the mechanism is shown to include spaced end plates 10 and side plates 11. Housed within the frame are two groups of generally parallel boards, each group including a first board 12 carrying electrical terminals 13, and a second board 14 carrying electrical contacts generally indicated at 15 in FIGS. 4 and 5. The contact carrying boards 14 are mounted at opposite parallel side faces of a hollow rectangular board 17 located in centered position as by frame pins 18 extending generally normal to the boards and body 17 and at corner portions of the latter. Further, boards 14 extend in the space between terminal or common boards 12, the latter being carried by actuator plates 18*a* containing corner openings 19 to pass the frame pins 18, whereby the plates and boards 12 are movable on the pins relatively toward the respective boards 14 to reduce the space 20 therebetween.

Such movement is effected to unusual advantage by cam and spring elements assembled with the actuator plates to resiliently and simultaneously urge the first boards 12 toward the second boards 14. For example, three circular cams 21 are eccentrically mounted on each of two parallel shafts 22 respectively projecting lengthwise between side plates 11 and actuator plates 18*a*, the shafts having rotary bearing mounting by the housing end plates 10 as at 23. A gear train 24 including spur gears 25–27 at one end of the frame interconnects the shafts 22, so that as actuator lever 29 on the end 28 of one shaft 22 is rotated, both shafts 22 are turned to effect cam displacement of the plates 18*a* on pins 18 from FIGS. 2 and 4 open positions to FIGS. 3 and 5 closed positions. Such movement is resiliently opposed by the coil springs 30 carried on the pins 18*a* between the space 20 between boards 12 and 14. Upon release of the lever 29, the boards 12 are returned to FIGS. 2 and 4 position by the springs 30.

Figure 2:
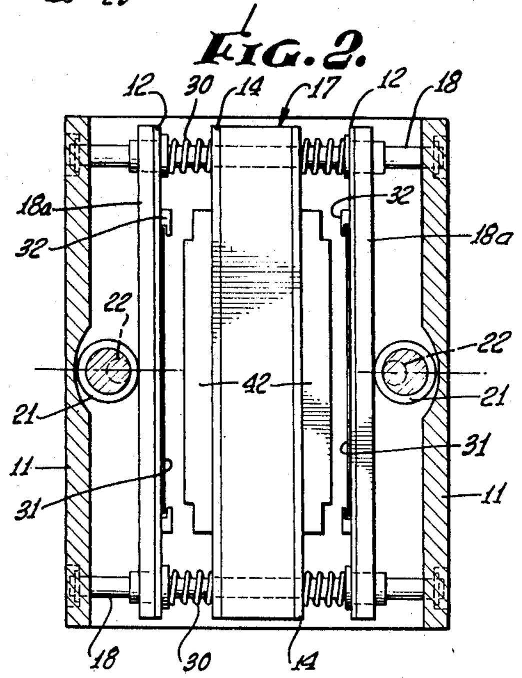
FIG. 2 is a section taken on line 2—2 of FIG. 1, showing the assembly in position for card insertion and withdrawal.
Figure 3:
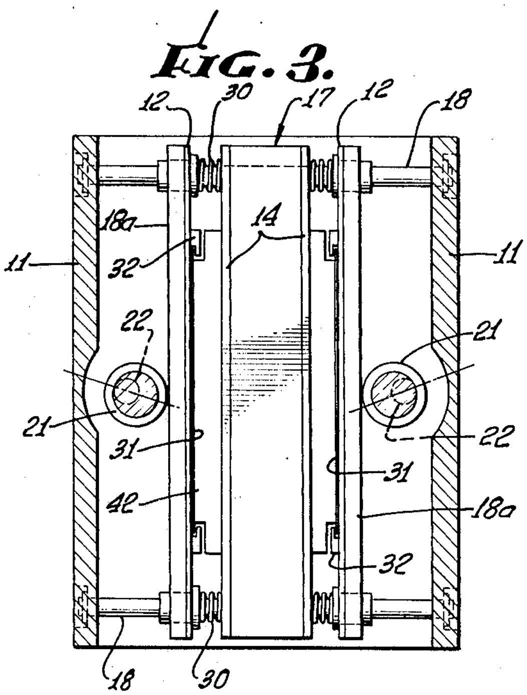
FIG. 3 is a view like FIG. 2 but showing the assembly in card reading configuration.
Figure 6:
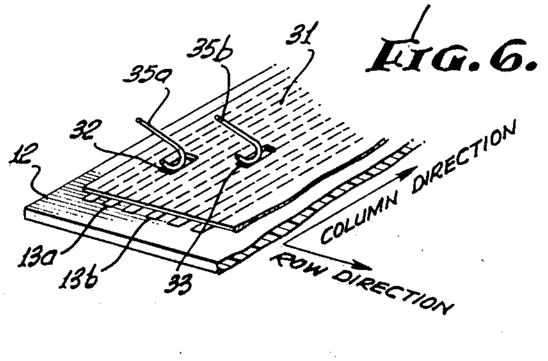
FIG. 6 is a fragmentary perspective showing of the contacts, tab card and terminal board.
Figures 4, 5:
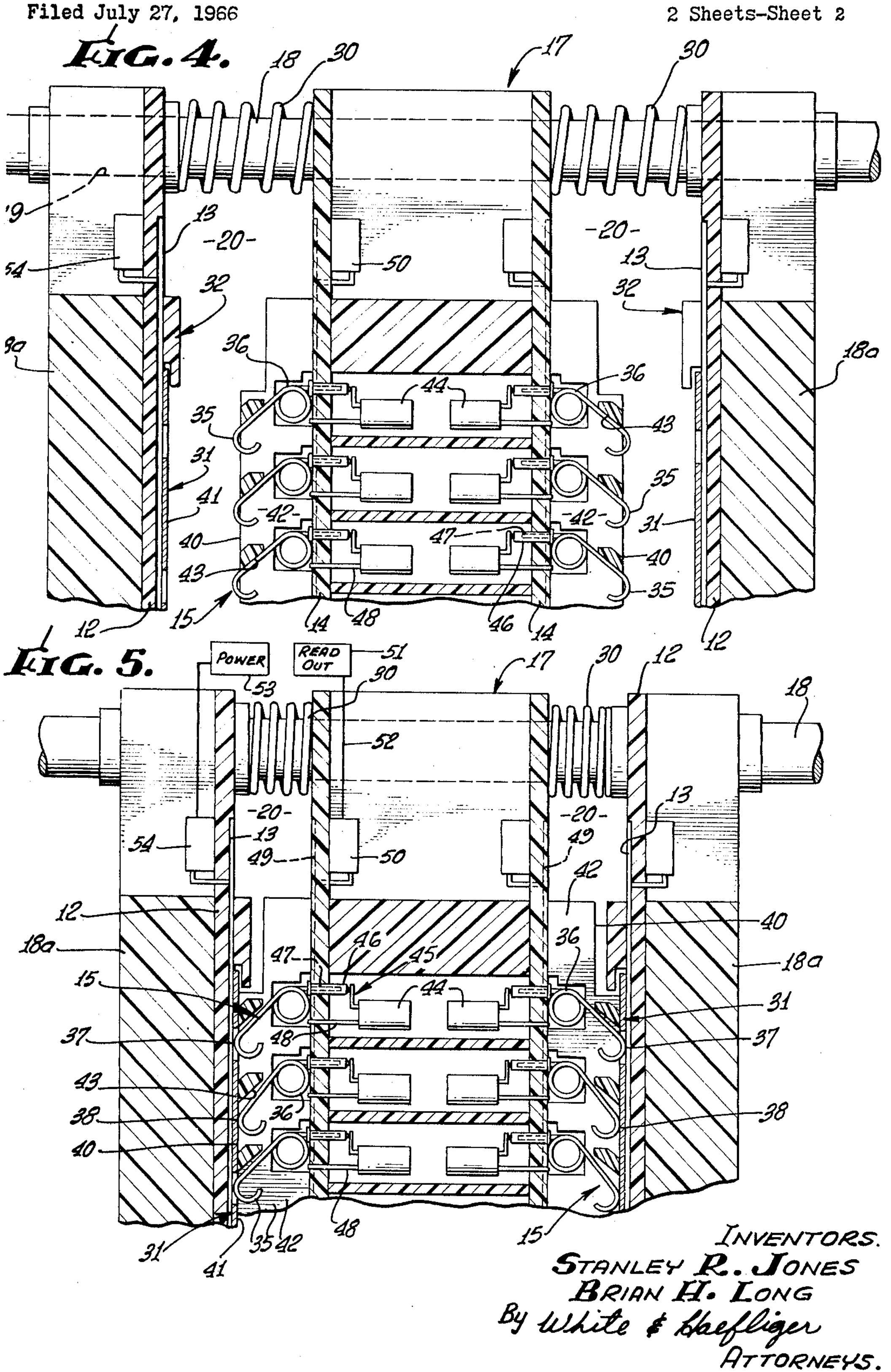
FIG. 4 is an enlarged cross section taken through the assembly to show details of construction, the contacts withdrawn relative to the tab cards.
FIG. 5 is a view like FIG. 4, but showing the contacts closed relatively toward the tab cards.

When the boards are in open position as seen in FIGS. 2 and 4, two tabulating cards 31 may be inserted adjacent the terminal boards 12, as indicated in those views, the rectangular cards being located as by edge guides and retainer 32. The punch cards themselves are conventional, having symbol zone rows and colums, as for example lengthwise extending columns and transversely extending rows of symbols subdividing the width of the card into approximately 12 rows. FIG. 6 shows a typical card 31 having two punched out openings 32 and 33 in different columns respectively overlying two parallel elongated terminals 13*a* and 13*b* of the terminal or bus group 13 on insulative board 12. Two projecting curved end portions 35*a* and 35*b* of wire contacts 15 are shown penetrating through the openings 32 and 33 to engage the terminals 13*a* and 13*b* with wiping action, as will be further described. In general, the projecting portions of contacts 15 are arranged in rows and columns to correspond to the tab card symbol zone rows and columns.

Referring again to FIGS. 4 and 5, the electrical contacts 15 carried by insulative boards 14 comprise wire looped at 36 to form cantilever springs with contact portions 35 projecting in cantilever relation and toward board 12 for registration with tab card symbol zones at the column and row intersection. Upon relative closure of boards 12 and 14, the portions 15 in registration with punched out card symbol zones penetrate the card to engage the terminals 13 on the board 12 and to flex as seen at 37 in FIG. 5 with terminal wiping action. The contact portions that register with unpunched out symbol zones engage the tab card and flex as seen at 38 in FIG. 5, the card being electrically insulative. The large wire loops 36 accommodate such flexing of all contacts with minimum resistance so as to reduce the amount of force needed to effect closure of the boards and card reading, thereby furthering the objective of multiple and simultaneous card reading. At the same time, sufficient contact force against terminals 13 is provided to eliminate noisiness and improper functioning.

FIGS. 4 and 5 also indicate the provision of insulative spacer plates 40 carried proximate the boards 14 to forcibly engage those sides 41 of the tab cards toward which the contacts 15 project, thereby to limit closure and contact flexing. Spacers 40 contain openings or slots 42 receiving the contacts with end portions 35 thereof projecting slightly beyond the faces of spacers 40, as seen in FIG. 4. Shoulders 43 on the spacer plates retain the contacts in tensioned condition to locate contact end portions 35 in the same plane parallel to the planes of boards 12 and 14.

Finally, the body 17 contains electrical circuitry carried at the sides of boards 14 opposite the spacers 42, and having electrical connection with the contacts 15. For example, diode packs are indicated at 44 as having electrical connection at 45 with tubular receptacles 46 for the contact wire ends 47, the receptacles being mounted in boards 14. The packs 44 have electrical connection at 48 with busses 49 on boards 14, and the busses connect with plug-in terminals 50 at the ends of the boards. Readout means is indicated at 51 connected at 52 with terminals 50. Power may be supplied at 53, and via plug-in end terminals 54 in boards 12, to the terminals or busses 13 engageable by contacts 15.

We claim:

1. In a tab card reader, the combination comprising:

(a) first and second boards spaced apart to receive a tab card therebetween, (b) electrical terminals on the first board to register with tab card symbol zones subject to selective punch out, (c) electrical contacts carried by the second board and comprising wire defining pre-tensioned torsion spring loops, each of said loops comprising at least one helical turn, with contact portions projecting therefrom in cantilever relation and toward the first board for registration with tab card symbol zones, and shoulders carried by the second board and engaged by the contacts to maintain the spring loops in torsional tension when said contact portions are out of engagement with said terminals and tab card, and at the same time to maintain contact end portions tangent to the same plane, (d) and means to effect reduction of the spacing between said boards to cause contact portions in registration with punched out symbol zones to engage said terminals and flex with terminal wiping action and to cause contact portions in registration with unpunched out symbol zones to engage the tab card and likewise flex.

2. The combination of claim 1 including the tab card which is electrically insulative.

3. The combination of claim 1, in which said contact portions are arranged in rows and columns to correspond to tab card symbol zone rows and columns, said terminals comprising parallel busses corresponding to said column arrangement of the contact portions.

4. The combination of claim 1, including an insulative spacer carried proximate the second board to forcibly engage that side of the tab card toward which said contacts project to limit contact flexing, said spacer containing openings receiving the contacts.

5. The combination of claim 4, including guide means to locate the tab card in said space with the symbol zones in registration with said contacts.

6. The combination of claim 4, including electrical circuitry carried by said second board at the side thereof opposite said spacer and having electrical connection with said contacts.

7. The combination as defined in claim 1, in which said last named means includes actuator, cam and spring elements assembled to resiliently urge the first board toward the second board, said mechanism having a first position in which the tab card is freely insertible into and removable from said space, and a second position in which the tab card is clamped in position between said boards.

8. In a tab card reader, a primary combination as defined in claim 1, and a secondary combination as defined in claim 1, the said second boards extending between the said first boards, said last named means of said primary and secondary combinations including actuator, cam and spring elements assembled to resiliently and simultaneously urge the first boards toward the second boards, and a frame to carry said mechanism.

9. The subject matter of claim 1, in which said mechanism has a first position in which the tab cards are freely insertible into and removable from said spaces, and a second position in which the tab cards are clamped in positions between the respective first and second boards.

10. A first board having terminals as defined in claim 1 for use in combination with a card reader as defined in claim 1.

11. A second board having contacts as defined in claim 1 for use in combination with a card reader as defined in claim 1.

12. Electrical circuitry as defined in claim 6, and including diodes, for use in combination with a card reader as defined in claim 1.

References Cited

UNITED STATES PATENTS

| | | | |
|---|---|---|---|
| 3,352,981 | 11/1967 | Ekers | 200—46 |
| 3,148,251 | 9/1964 | Burke. | |

OTHER REFERENCES

Webb: Diode Card Read-Only Memory," IBM Technical Disclosure Bulletin, vol. 4, No. 8, January 1962, p. 16.

Hauslein: "Multiple Sensing of Punched Cards," IBM Technical Disclosure Bulletin, vol. 4, No. 10, March 1962, p. 16.

MAYNARD R. WILBUR, Primary Examiner

T. J. SLOYAN, Assistant Examiner

U.S. Cl. X.R.

200—46; 340—339